Patented Oct. 31, 1933

1,933,091

UNITED STATES PATENT OFFICE 1,933,091

CATALYST AND METHOD OF MANUFACTURING SAME

Johann A. Bertsch, St. Louis, Mo., assignor, by mesne assignments, to Monsanto Chemical Company, a corporation of Delaware No Drawing. Application November 10, 1930
Serial No. 494,704

9 Claims. (Cl. 23—233)

The present invention relates to the manufacture of catalysts and catalyst carriers, and it has particular application to that class of catalysts which embody a silicious base or carrier.

One object of this invention is to provide a new class of silicious catalyst carriers which are relatively less expensive, and which are of substantially greater mechanical strength than any employed heretofore.

A further object of this invention resides in the provision of a new class of natural silica for use in catalysis.

A further object of the invention resides in obviating the necessity of fabricating pellets of a catalyst carrier by providing a natural carrier equal in activity to kieselguhr yet, unlike kieselguhr, capable of sustaining the mechanical handling and resisting the action of self abrasion incident thereto.

Heretofore kieselguhr has been employed almost exclusively in the manufacture of a large variety of catalysts. For this purpose it is pulverized, mixed with the catalytic agents and thereafter formed into pellets and dried. Although various binding agents have been recommended, the principal ones of which are water soluble silicates, the final product is unsatisfactory in that the carrier suffers from the effect of self abrasion and fails under very slight pressures. This manifestation is particularly unfortunate when the carrier must be removed from the converter from time to time to be reworked or revivified. Not infrequently these pellets fail within the converter and the resulting fragments tend to fill the interstices obstructing the normal flow of gas therethrough. When the catalyst carrier is intended for use in liquid phase reactions, the use of an artificial kieselguhr pellet is unsatisfactory if not impossible, since the pellets are particularly weak when wet. Moreover the physical effect of the liquid is often sufficient in itself to produce failures.

These disadvantages are overcome to a large extent, if not obviated, by the present invention according to which I reduce a rock-like natural substantially pure porous silica to the desired fragment size with the aid of a classification operation when deemed necessary. Subsequently, and if desired, the fragments are subjected to a self-abrasive action whereby the sharp edges are removed and a rounded product of uniform character is thereby obtained. Thereafter a catalytic agent is applied to the fragments or natural pellets, in the usual manner.

Kieselguhr or diatomaceous earth is a mineral consisting almost entirely of shells of diatoms of essentially pure silica. The product is porous, soft, velvet-like and may be reduced to pulverulent state by applying a very slight pressure.

I have discovered that certain minerals found in the Mississippi Valley termed variously Tripoli, Opalite, Carrara silica, geyserite, et al. are an excellent substitute for and have many distinct advantages over ordinary kieselguhr. The geological formation of this new class of minerals is not definitely known. Whereas kieselguhr indicates definite diatom residues in its structure as observed through a microscope and is readily rendered pulverulent with the application of but a slight pressure, Tripoli, such for example as is mined near Seneca, Missouri, appears to be a conglomerate of round silica particles which are bound together in a manner whereby a highly porous structure results. Carrara silica, a characteristic deposit of which is mined near Murphysboro, Illinois, as well as Opalite, such as is mined near Corona, Arkansas, are crypto crystallinic silicious materials having a high degree of porosity. It is conceivable that these minerals are metamorphosed diatomaceous substances of primary or secondary origin, or that they are silicates from which the base metal has been leached by underground acidic waters. Samples have been obtained which indicate no crystal formation; conceivably these materials have been formed as the result of precipitation of hydrated silica from water. Regardless of the theories of geological formation their physical properties distinguish them from kieselguhr and render them well suited for use in catalysis.

In practicing the invention, the rock is quarried and reduced to fragments which after a size classification meet the requirements of the particular catalytic process. In this form the fragments are treated with a solution of a catalytic reagent to deposit the catalytically active material thereon. However, to obtain a rounded pellet, the classified fragments are rotated in a cylinder or drum wherein they are exposed to a self-abrasive action. The time required for completing the fragment rounding operation will vary with the hardness of the mineral, the size of the particle, the amount of mechanical action to which the particles are subjected as well as the extent of abrasion sought. A satisfactory product has been obtained from a fragment which passes through a four mesh screen and is retained on a six mesh screen by rotating the same for a period of 24 hours. After the rotating operation is completed, the fines and dust are separated and washed off, and the resulting product is ready for the application of a reagent which will impart the desired catalytic effect.

Whether the fragment has previously been subjected to the rounding operation or not, the treatment with a catalytic agent is substantially the same and depends upon the specific catalytic process involved. Thus, for example, a good sulfuric anhydride catalyst is obtained by treating 330 liters of the fragments or granules with an aqueous solution containing an equivalent of 12 kilograms vanadium pentoxide and 20 kilograms of potassium hydroxide or a mixture of sodium and potassium hydroxides. After being dried, the product is calcined in the usual manner by passing acidic vapors (for example sulfur dioxide or sulfur trioxide) in contact with such mass or by treatment with dilute acid solutions. The product so obtained when employed in the catalytic oxidation of sulfur dioxide gives a conversion of 98.3%-98.8% at commercial loadings. Instead of pentavalent vanadium tetra- or trivalent vanadium may be substituted, and if desired, other catalytically active elements as silver, copper and aluminum included.

A desirable contact mass for the oxidation of ammonia to nitrogen oxides or sulfur dioxide to sulfur trioxide is obtained by treating the carrier with a solution of platinum chloride. The quantity of platinum necessary is not substantially greater than that required when silica gel is employed as a base. It is to be noted in this connection that this amount of platinum represents a substantial reduction over that which would be necessary in the case of a carrier of asbestos fibers or magnesium sulfate.

I have found that excellent catalyst is obtained when a carrier is treated with vanadium and potassium as described hereinabove and subsequently is treated with a small amount of a soluble platinum or other noble metal compound. The quantity of catalytic reagents so utilized under these circumstances may be reduced substantially below the quantity which is required when either one of the reagents is employed singly. Excellent results have been obtained with such a catalyst in the oxidation of sulfur dioxide to form sulfuric anhydride. Such catalyst may give a conversion of sulfur dioxide to sulfur trioxide of 97% and above when containing a ratio of ingredients substantially as follows: 330 liters of carrier, 240 grams platinum, 6 kilograms vanadium pentoxide, 6 kilograms potassium hydrate.

A good catalyst for the liquid phase hydrogenation of phenols may be prepared by saturating the silica carrier with a nickel solution and thereafter reducing the nickel in the usual manner.

The vapor phase hydrolysis of chlorbenzol with steam is effected advantageously at 300°-450° C. by means of this carrier which has been treated with a copper salt.

In an analogous manner, the natural silica may be employed as a carrier for copper in the dehydrogenation of alcohol to form aldehydes. For this purpose, the carrier is treated with a solution of copper nitrate after which the copper is reduced with hydrogen. It is interesting to note that the carrier in the above examples functions not as a mere diluent, but for reasons which are not understood co-acts with the catalytic reagent which is deposited thereon to stimulate the catalytic reaction. This effect is exemplified particularly in the case of sulfur dioxide oxidation catalysts.

Although several examples of the application of the principles of the present invention are set forth, it is to be understood that these are merely exemplary and do not limit the invention which contemplates broadly the use of a natural porous silica fragment which possesses relatively greater mechanical strength and resistance to self abrasion than kieselguhr and which fragment may, if desired, be subjected to a self-abrasive action in order to round the edges of the natural fragment.

The term "fragments" appearing in the claims is to be understood as comprehending the product obtained by reducing a naturally occurring mineral to the desired dimension as contrasted to an article produced by moulding relatively finely divided particles into a substantially larger form or shape.

What I claim is:

1. As an article of manufacture, a catalyst carrier consisting of fragments of a natural porous substantially pure silica selected from a group consisting of the following: tripoli, opalite, Carrara silica and geyserite possessing relatively greater mechanical strength and resistance to self-abrasion than kieselguhr.

2. An article of manufacture consisting of fragments of a natural porous substantially pure silica selected from a group consisting of the following: tripoli, opalite, Carrara silica and geyserite possessing relatively greater mechanical strength and resistance to self-abrasion than kieselguhr, and having deposited thereon a compound of vanadium oxide and an alkali metal compound.

3. As an article of manufacture, a catalyst carrier consisting of fragments of a natural porous substantially pure silica selected from a group consisting of the following: tripoli, opalite, Carrara silica and geyserite possessing relatively greater mechanical strength and resistance to self-abrasion than kieselguhr, said fragments having deposited thereon a catalytic agent consisting of a compound of vanadium and a compound of potassium.

4. An article of manufacture consisting of fragments of a natural porous substantially pure silica selected from a group consisting of the following: tripoli, opalite, Carrara silica and geyserite possessing relatively greater mechanical strength and resistance to self-abrasion than kieselguhr, and having deposited thereon a composition having catalytic properties.

5. An article of manufacture consisting of fragments of a natural porous substantially pure silica selected from a group consisting of the following: tripoli, opalite, Carrara silica and geyserite possessing relatively greater mechanical strength and resistance to self abrasion than kieselguhr and having previously been treated with a water soluble vanadium compound and an alkali metal compound.

6. An article of manufacture consisting of fragments of a natural, porous, substantially pure silica possessing relatively greater mechanical strength and resistance to self-abrasion than kieselguhr, said fragments having rounded edges and having deposited thereon a composition having catalytic properties.

7. An article of manufacture consisting of fragments of a material selected from the group consisting of tripoli, opalite, Carrara silica and geyserite, said fragments having rounded edges and having deposited thereon a composition having catalytic properties.

8. An article of manufacture consisting of fragments of a material selected from the group consisting of tripoli, opalite, Carrara silica and geyserite, said fragments having deposited thereon a composition having catalytic properties and having rounded edges.

9. An article of manufacture consisting of fragments of Carrara silica having rounded edges and having been treated with vanadium oxide and an alkali metal hydroxide.

JOHANN A. BERTSCH.